US008959371B2

(12) United States Patent  
Tran

(10) Patent No.: US 8,959,371 B2  
(45) Date of Patent: Feb. 17, 2015

(54) TECHNIQUES FOR REDUCING PROCESSOR POWER CONSUMPTION THROUGH DYNAMIC PROCESSOR RESOURCE ALLOCATION

(75) Inventor: Thang M. Tran, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 275 days.

(21) Appl. No.: 13/551,220

(22) Filed: Jul. 17, 2012

(65) Prior Publication Data

US 2014/0025967 A1    Jan. 23, 2014

(51) Int. Cl.
G06F 1/00 (2006.01)
G06F 1/32 (2006.01)

(52) U.S. Cl.
USPC ........... 713/320; 713/300; 713/323; 713/324; 712/15; 712/229

(58) Field of Classification Search
CPC ..... H04L 45/54; G06F 1/3203; G06F 1/3225; G06F 1/3296; G06F 9/5044; G06F 9/5094; G06F 12/0895

USPC ............. 713/300, 320, 323, 324; 712/15, 229
See application file for complete search history.

(56) References Cited

U.S. PATENT DOCUMENTS 7,447,923 B2 * 11/2008 Bose et al. .................... 713/300
7,500,126 B2    3/2009 Terechko et al.
7,962,770 B2    6/2011 Capps, Jr. et al.

* cited by examiner

Primary Examiner — Michael J Brown
(74) Attorney, Agent, or Firm — Yudell Isidore PLLC

(57) ABSTRACT

A technique for performing power management for configurable processor resources of a processor determining whether to increase, decrease, or maintain resource units for each of the configurable processor resources based on utilization of each of the configurable processor resources. A total weighted power number for the processor is substantially maintained while resource units for each of the configurable processor resources whose utilization is above a first level is increased and resource units for each of the configurable processor resources whose utilization is below a second level is decreased. The total weighted power number corresponds to a sum of weighted power numbers for the configurable processor resources.

20 Claims, 5 Drawing Sheets

| | WEIGHTED POWER* | UNIT | MIN CONFIGURATION | MIN POWER | MAX CONFIGURATION | MAX POWER | EXAMPLE CONFIGURATION | EXAMPLE POWER |
|---|---|---|---|---|---|---|---|---|
| INSTRUCTION QUEUE | 8 | 8 ENTRIES | 2 | 16 | 4 | 32 | 2 | 16 |
| PHYSICAL REGISTER FILE | 16 | 32 ENTRIES | 1 | 16 | 4 | 64 | 2 | 32 |
| SIMPLE (ALU) UNITS | 2 | 1 ALU | 2 | 4 | 6 | 12 | 4 | 8 |
| CHECKPOINT REGISTERS | 4 | 1 SET | 8 | 32 | 32 | 128 | 16 | 64 |
| LOAD/STORE EXECUTION QUEUES | 6 | 1 QUEUE | 3 | 18 | 12 | 72 | 8 | 48 |
| COMPLEX EXECUTION QUEUES | 6 | 1 QUEUE | 1 | 6 | 4 | 24 | 3 | 18 |
| LOAD/STORE BUFFERS | 12 | 8 ENTRIES | 1 | 12 | 4 | 48 | 2 | 24 |
| BRANCH TARGET BUFFERS | 32 | 512 ENTRIES | 1 | 32 | 4 | 128 | 2 | 64 |
| GLOBAL HISTORY TABLE | 6 | 512 ENTRIES | 1 | 6 | 16 | 96 | 8 | 48 |
| ICACHE - WAYS | 16 | 4KB | 2 | 32 | 16 | 256 | 8 | 128 |
| DCACHE - WAYS | 16 | 4KB | 2 | 32 | 16 | 256 | 8 | 128 |
| LOAD/STORE UNIT** | 64 | 1 LSU | 1 | 64 | 2 | 128 | 2 | 128 |
| TOTAL POWER | | | | 270 | | 1244 | | 706 |
| * BASED ON POWER ESTIMATED TOOL | | | | | | | | |
| ** EXTRA POWER SAVING IN ADDITION TO LS EXECUTION QUEUES, LS BUFFERS, AND DACHE | | | | | | | | |

FIG. 3

TECHNIQUES FOR REDUCING PROCESSOR POWER CONSUMPTION THROUGH DYNAMIC PROCESSOR RESOURCE ALLOCATION

BACKGROUND

1. Field

This disclosure relates generally to reducing processor power consumption and, more specifically, to techniques for reducing processor power consumption through dynamic processor resource allocation.

2. Related Art

Traditionally, for computing systems, processor power consumption has been controlled by limiting processor performance through processor voltage/frequency scaling. For example, the Advanced Configuration and Power Interface (ACPI) specification provides an open standard for device configuration and power management via an operating system (OS).

The ACPI specification defines four global states (G0-G3) and six sleep states (S0-S5) for an ACPI-compliant computer system as follows: in the G0 (or S0) state a computer monitor is off, but background tasks are running; the G1 state is subdivided into the four states S1 through S4 (i.e., in the S1 state all processor caches are flushed, central processing units (CPUs) stop executing instructions, power to the CPUs and random access memory (RAM) is maintained, and devices that do not indicate they must remain on may be powered down; in the S2 state the CPUs are powered off and dirty cache is flushed to RAM; in the S3 state RAM remains powered; and in the S4 state all content of main memory is saved to non-volatile memory (NVM), such as a hard drive, and main memory is powered down); in the G2 (or S5) state (which is similar to the G3 state, except that the power supply unit still supplies power, at a minimum, to the power button to allow return to the state S0), a full reboot is required, no previous content is retained, and other components may remain powered so the computer system can wake on input from the keyboard, clock, modem, local area network (LAN), or universal serial bus (USB) device, etc.; and in the G3 state where the computer's power has been totally removed via a mechanical switch, the power cord can be removed, and the system is safe for disassembly (typically, only the real-time clock continues to run using its own small battery).

According to the ACPI specification, processor power states are defined as follows: the C0 state is the operating state; the C1 state is where the processor is not executing instructions, but can return to an executing state essentially instantaneously; the C2 state is where the processor maintains all software-visible states, but may take longer to wake up; and the C3 state is where the processor does not need to keep its cache coherent but maintains other states. According to the ACPI specification, an operating processor can be in one of several power-performance states (e.g., P0-Pn) that are implementation-dependent. In any case, the P0 state is always the highest-performance state, with P1 to Pn being successively lower-performance states, up to an implementation-specific limit of n no greater than 16. In the P0 state a processor is at maximum power and frequency. At successive P1-P15 states a processor voltage/frequency is scaled to a greater degree to utilize less power, albeit at lower performance.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 is an exemplary table of values for the processor of FIG. 2 according to another aspect of the present invention.

DETAILED DESCRIPTION

Figure 1:
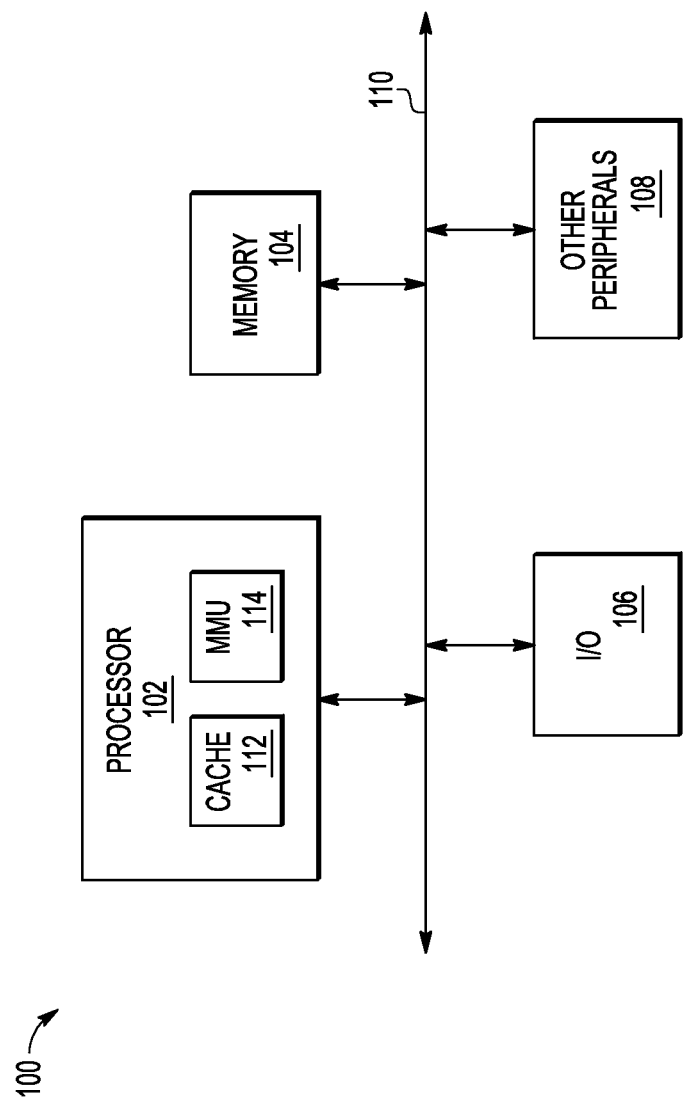
FIG. 1 is a block diagram of a relevant portion of a data processing system configured according to one embodiment of the present invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. As may be used herein, the term 'coupled' includes a direct electrical connection between elements or components and an indirect electrical connection between elements or components achieved using one or more intervening elements or components.

In designing a processor it is desirable for a given processor to meet a wide variety of customer requirements for performance and power consumption in order to increase an available customer base for the given processor. In general, a desired processor power consumption depends on an application specified by a customer. For example, when the processor is implemented in a mobile phone, a desired processor power consumption may be, for example, limited to less than about 1 Watt by a customer. As another example, when the processor is implemented in a laptop computer system, a desired processor power consumption may be, for example, limited to less than about 15 Watts by a customer. As yet another example, when the processor is implemented in a server, a desired processor power consumption may be, for example, limited to less than about 30 Watts by a customer. In general, a processor that operates at a higher performance level has a higher power requirement than when the processor is operating at a lower performance level. It is contemplated that a configurable processor, as disclosed herein, may be employed in a wide variety of applications. For example, a configurable processor as disclosed herein may be employed in a network router.

At least one conventional processor design has allowed processor performance to be tailored to customer power requirements. In the conventional processor design, a number of different configurations of the processor were selected that did not exceed a desired power consumption. The processor then executed a selected code for the different configurations and one of the different configurations was selected based on which of the configurations provided a highest performance (e.g., based on instructions per cycle (IPC)) at the desired power consumption. The selected configuration was then entered into a data structure, along with other configurations for different power consumption levels, for later selection based on customer power requirements.

As one example, a way of a cache (e.g., an instruction cache and/or a data cache) may be decreased to meet customer power requirements. For example, a cache may be reconfigured from a 16-way set associative cache to an 8-way set associative cache to reduce power requirements of an associated processor and meet customer power requirements. As another example, a depth of a queue (e.g., an integer instruction queue and/or a floating point unit (FPU) instruction queue) may be decreased to reduce power requirements of an associated processor and meet customer power requirements. As yet another example, a size of a register file (e.g., an integer register file and/or a FPU register file) may be decreased to reduce power requirements of an associated processor and meet customer power requirements.

With reference to FIG. 1, an exemplary data processing system 100 includes a processor 102, a memory 104, an input/output port 106, and other peripherals 108, each coupled to a bus 110. The processor 102 includes a cache 112 and a memory management unit (MMU) 114 for managing memory 104 and may include one or more processor cores (not specifically shown). The memory 104 includes an application appropriate amount of volatile memory (e.g., dynamic random access memory (DRAM) and/or static RAM (SRAM)) and non-volatile memory (e.g., flash and/or read-only memory (ROM)).

Figure 2:
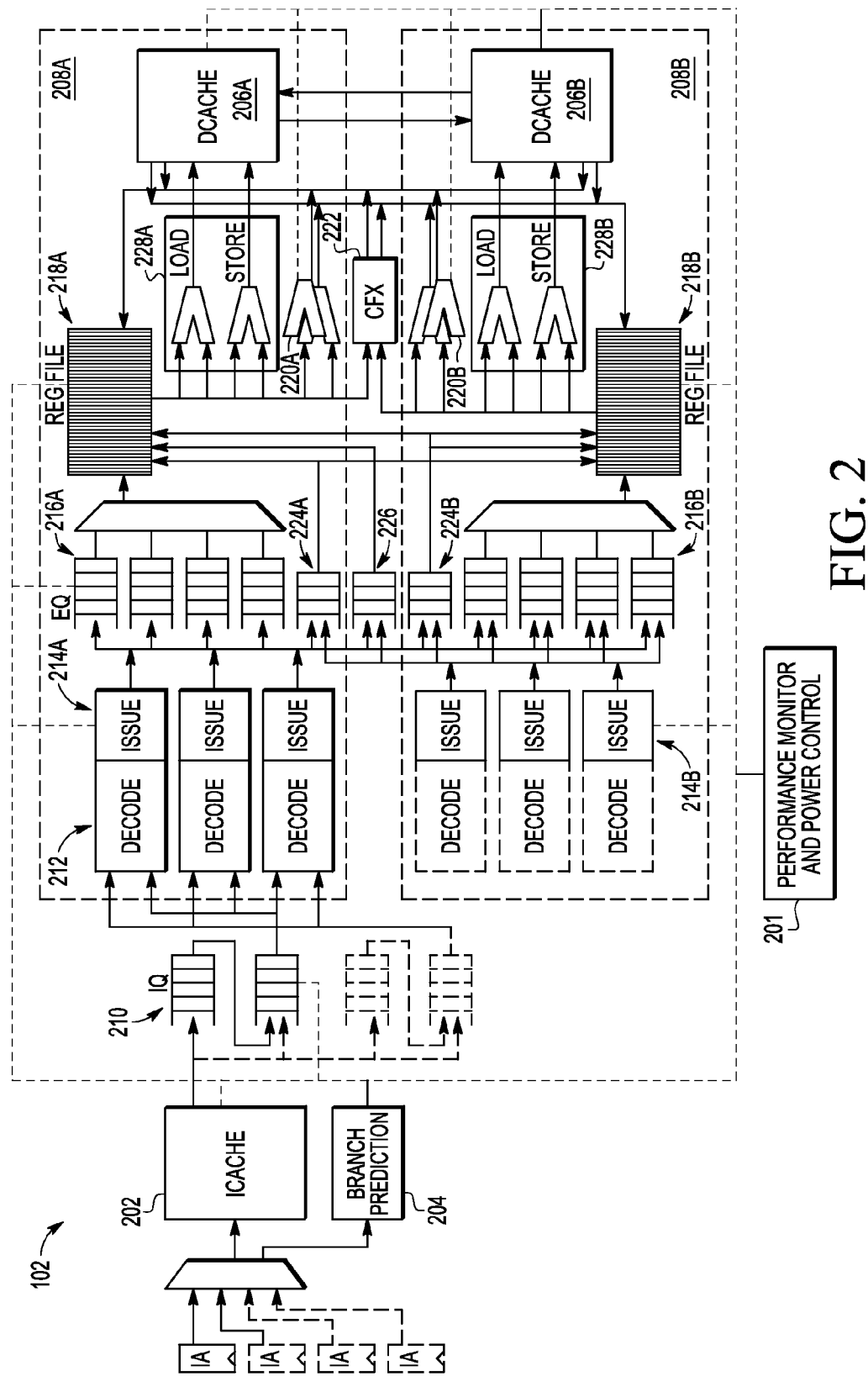
FIG. 2 is a more detailed block diagram of an exemplary processor of the data processing system of FIG. 1 according to one or more embodiments of the present invention.

FIG. 2 is a more detailed block diagram of relevant portions of the processor 102 according to one embodiment of the present disclosure. As is shown, the processor 102 includes a number of reconfigurable blocks 208A and 208B (shown in dashed lines). Available resources for each of the reconfigurable blocks 208A and 208B may be changed by writing appropriate values to associated configuration registers (not separately shown). As shown, the decode and execution units are grouped into two reconfiguration blocks 208A and 208B. Notations "A" and "B" denote the same block in each of the reconfiguration blocks 208A and 208B. Each reconfiguration block 208 includes an issue unit 214, load/store execution queues 216, a simple execution queue 224, register files 218, a load/store unit 228, a simple execution unit 220, and a data cache 206. A complex execution queue 226 and a complex functional execution unit 222 are not duplicated as are other units.

Specifically, the processor 102 includes a reconfigurable instruction cache (Icache) 202 and reconfigurable data caches (Dcache) 206A and 206B (i.e., one for each load/store unit 228A and 228B). The caches 202, 206A, and 206B may be, for example, implemented within the cache 112 of FIG. 1 and are configurable with respect to way and/or size. For example, the caches 202, 206A, and 206B may be reconfigured from a 16-way set associative caches to 2-way set associative caches (e.g., by 2) to reduce power requirements of the processor 102, albeit at loss of processor performance. The cache 202 may also be configurable with respect to depth. Similarly, a depth and way of branch target buffer (BTB) and a depth of a global history buffer (GHB) or global history table (not separately shown) within branch prediction unit 204 may be reconfigured to increase power requirements and performance of the processor 102 or to decrease power requirements and performance of the processor 102.

For example, the depth of the BTB may vary between 512 bytes and 2 k bytes (by 512 bytes) and/or a way may be changed by writing appropriate values to associated registers. As another example, the depth of the GHB may vary between 512 bytes and 8 k bytes (by 512 bytes). As yet another example, a depth of the instruction cache 202 may vary from 8 k bytes to 64 k bytes (by 8 k bytes) and the data caches 206A and 206B may vary from 4 k bytes to 64 k bytes (by 4 k bytes). Similarly, the number of instruction queues 210 may also be configurable to achieve a desired power consumption. For example, the instruction queues 210 may vary between 16 and 32 entries.

Similarly, decode units 212 and issue units 214 may be increased or decreased to achieve a desired power consumption and performance. The number of execution queues (EQ) which include load/store execution queues 216A and 216B, simple execution queues 224A and 224B, and complex execution queues 226, may also we varied. In general, the simple EQs are utilized for instructions that are executed in one processor cycle and the complex EQs are utilized for instructions that require more than one processor cycle to execute or that are infrequently utilized (and, as such, specific hardware to execute the complex instruction is not implemented in a simple execution unit). As is illustrated in FIG. 2, the processor 102 also includes configurable physical register files (labeled "REG FILE") 218A and 218B (i.e., one for each reconfigurable block 208A and 208B).

For example, the register files 218A and 218B may configurable to vary from 32 entries to 128 entries (by 32). As is also illustrated, the processor 102 also includes configurable arithmetic logic units (ALUs) 220A and 220B and a non-configurable complex function (CFX) unit 222. The processor 102 can run in a single-thread mode or in a multi-thread mode in which the reconfigurable block 208A or 208B are each dedicated to a different thread. As mentioned above, either of the reconfigurable blocks 208A and 208B can be shut-down to reduce processor power consumption during low-activity (low performance) mode, albeit at the loss of processor performance.

With reference to FIG. 3, an exemplary table 300 illustrates possible configurations for at least some of the configurable resources of the processor 102. The weighted power column refers to a weighted power consumed by each of the resources. For example, dividing the amount of weighted power consumed by a given resource by the weighted powers for each of the resources and multiplying the result by a total actual power provides an actual power consumed by the resource. For example, if a total desired power consumption is 1.96 Watts, then each weighted power unit corresponds to 10 mW (as the total weighted power is 196). In the various embodiments, weighted power is based on power readings from a power estimate tool (e.g., during development).

It should be appreciated that the weighted powers are based on the power consumption of each of the processor resources with respect to each other. For example, as the weighted power for a 32-entry physical register file is twice that of an 8-entry instruction queue, the 32-entry physical register file consumes twice the power of the 8-entry instruction queue. In the example shown in FIG. 3, the weighted power number for the example configuration is 706. Assuming that it was desirable to add two more (32 entry) register file units for performance (2*16=32), it would be necessary to reduce the weighted power by 32 to achieve the example weighted power number of 706.

In this case, a processor resource that had little effect on performance may be reduced. For example, a BTB may be reduced from a configuration of 2 units (512 entries) to 1 unit (1*32=32) to offset the increase in weighted power attributable to adding two more register file units. As another example, a GHB may be reduced from 8 units to 4 units (4*6=24) and checkpoint registers may be reduced from 16 units to 14 units (2*4=8) to offset the increase in weighted power attributable to adding two more register files. It should be appreciated that the minimum and maximum configurations for the configurable processor resources are exemplary. Moreover, it should be appreciated that the configurable processor resources are also exemplary. Accordingly, a processor according to the present disclosure may have different configurable resources and different minimum and maximum configurations.

According to various aspects of the present disclosure, the performance monitor and power control (PMPC) unit 201 is configured to monitor utilization for each implemented configurable processor resource. As noted above, each configurable processor resource is assigned a weighted power number for a given unit. A fixed power level is then preset that corresponds to a total weighted power number for all configurable resources implemented.

In one embodiment, at a predetermined number of processor cycles, configurable processor resources are dynamically enabled or disabled (by writing appropriate values to associated configuration registers), as needed, to substantially maintain the total weighted power number while achieving near optimal processor performance for the given total weighted power number. A resource list (not separately shown) is maintained by the PMPC unit 201 to facilitate prioritizing processor resources based on processor performance. The resources list is then accessed to determine what resource or resources may be reduced when another resource requires additional resources. For example, if a simple execution unit has a weighted power of 1, one way of a cache array has a weighted power of 8, and one way of a BTB has a weighted power of 2 and it is desirable to maintain a desired power number while adding two simple execution units (addition of 2 to the weighted power number), a way of the BTB can be reduced by one assuming the BTB is not already at a minimum.

According to aspects of the present disclosure, a number of different threshold levels may be implemented to determine what action to take based on utilization of a configurable processor resource. As one example, assume that provisioned simple arithmetic logic units (ALUs) are at a starving level (e.g., ninety percent utilization) over an interval (e.g., one million processor cycles). In this case, the ALUs are over-utilized and processor performance is suffering. As such, even if adding another ALU would cause a desired power level to be exceeded, one or more additional ALUs should be added. As another example, assume that simple ALUs are at a trade-off level (e.g., seventy percent utilization) over an interval. In this case, ALU units may be traded-off with other configurable processor units to increase ALU performance by adding additional ALUs when some other configurable processor resource may be reduced.

As yet another example, assume that simple ALUs are at an over-provisioned level (e.g., thirty percent utilization) over an interval. In this case, the ALUs are over-provisioned (with respect to performance need) and, as such, ALU units may be reduced if another configurable processor resource requires additional units. As yet another example, assume that provisioned simple ALUs are at a rarely-utilized level (e.g., ten percent utilization) over an interval. In this case, the rarely-utilized ALUs have little effect on processor performance and, as such, the rarely-utilized ALUs may be turned-off.

Figure 4:
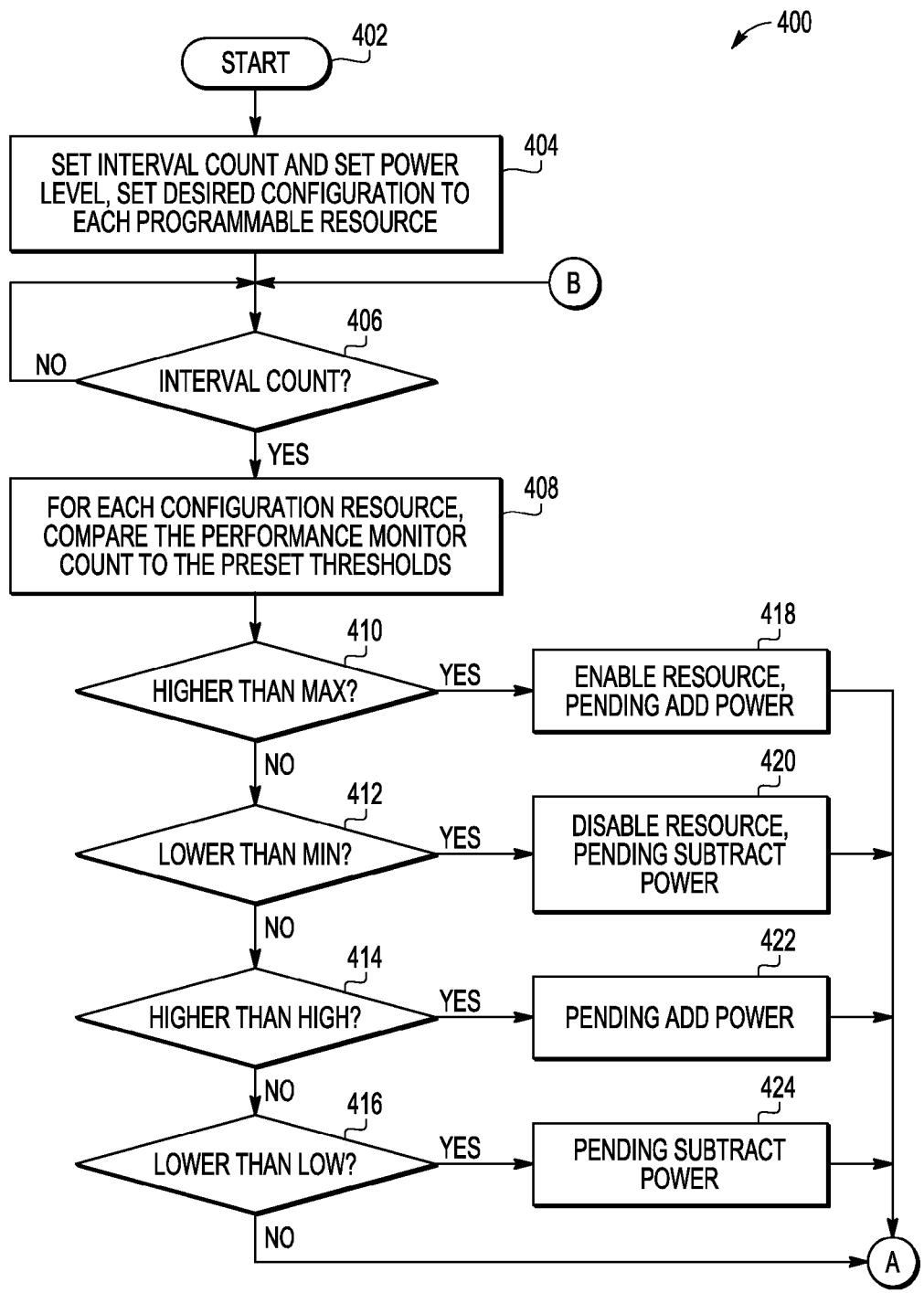
FIGS. 4 and 5 depict a flowchart of an exemplary configuration process for the processor of FIG. 2 according an embodiment of the present invention.
Figure 5:
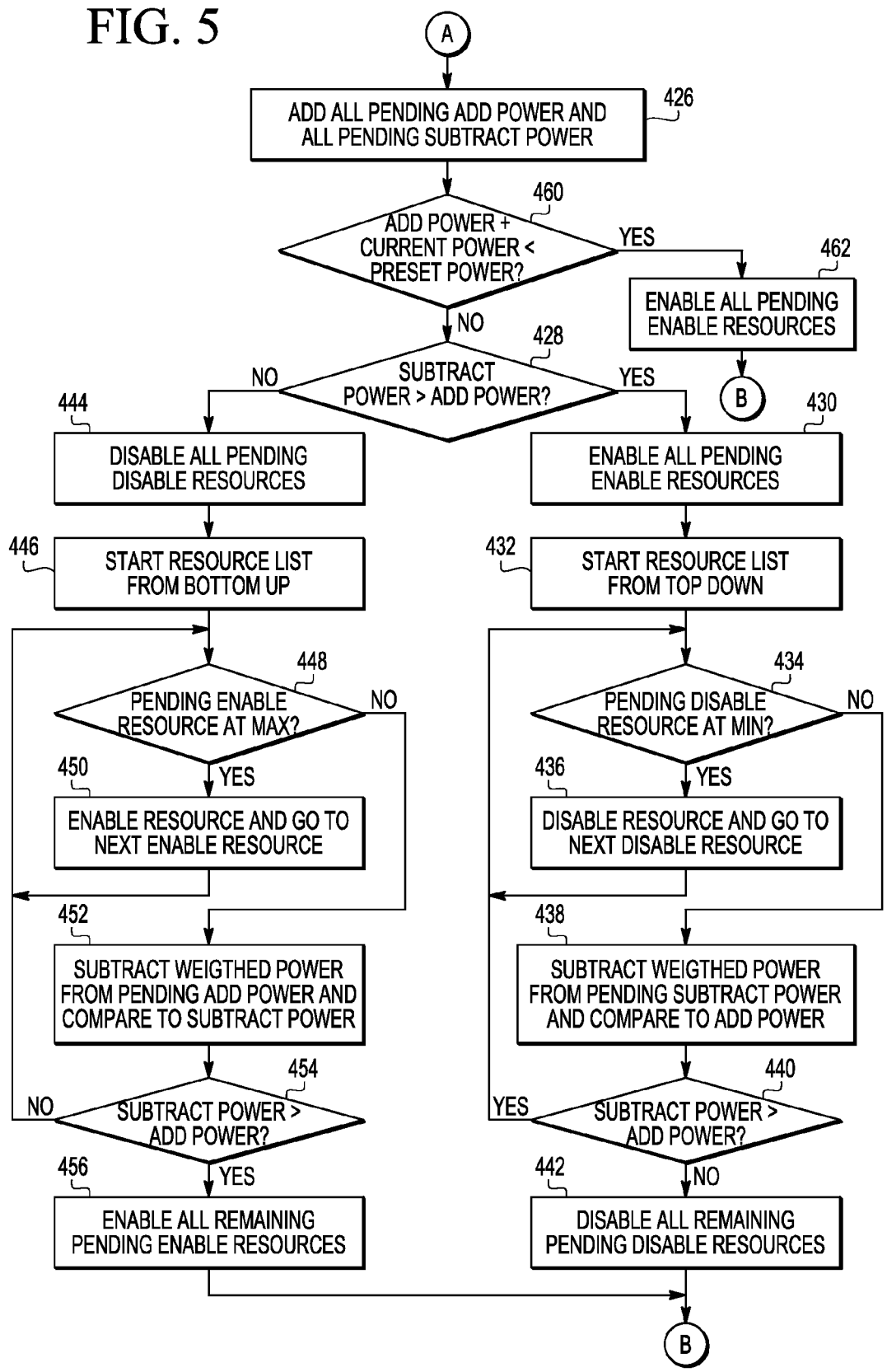

With reference to FIGS. 4 and 5, a flowchart of an exemplary dynamic processor configuration process 400 is illustrated that may be implemented by performance monitor and power control (PMPC) unit 201. The process 400, as executed by the PMPC unit 201, facilitates dynamic configuration of each configurable processor resource (e.g., by writing to a configuration register of the configurable processor resource) to achieve a substantially highest processor performance at a substantially desired power consumption level (e.g., a peak or an average power consumption level). The process is initiated in block 402, at which point control transfers to block 404. In block 404 an interval count and the preset power level are programmed in the PMPC unit 201 and a resource list (not shown) is programmed in the PMPC unit 201 to set a desired configuration for each reconfigurable resource in the resource list. For example, the interval count may be set to a value that averages over short-term processing spikes, e.g., one million processor cycles, and the units of the configurable processor resources may be set to the example configuration of FIG. 3.

The resource list may be configured such that a configurable processor resource with the most impact on processor performance is at a top of the resource list and a reconfigurable resource with the least impact on processor performance is at a bottom of the resource list. For example, the instruction cache 202 and the instruction queues 210 may be toward the bottom of the resource list, as they affect processor performance to a lesser degree than other configurable processor resources. As another example, simple execution units 220A and 220B and the data caches 206A and 206B may be toward the top of the resource list as they affect processor performance to a greater degree than other configurable processor resources.

Next, in block 406, the PMPC unit 201 determines whether an interval count has been reached (i.e., whether it is time to determine whether configurable processor resources require reconfiguration). When the interval count is not reached (e.g., a particular processor cycle is less than a desired processor cycle, such as five-hundred thousand processor cycles), control loops on block 408. When the interval count is reached (e.g., a particular processor cycle is reached), control transfers from block 406 to block 408. In block 408, the PMPC unit 201 determines a performance monitor count (e.g., utilization) for each configurable processor resource. Next, in decision blocks 410, 412, 414, and 416, the PMPC unit 201 compares the performance monitor count for each of the configurable processor resources to determine if additional resource units are required for the configurable processor resources. It should be appreciated that comparison of the performance monitor count for each of the configurable processor resources may be performed in parallel. The resource units may, for example, correspond to a number of set associative ways of a memory, a resource size, or a number of resources allocated.

In block 410, the PMPC unit 201 determines whether utilization of the configurable processor resource is greater than a first level (i.e., higher than max?). If utilization of the configurable processor resource is not greater than the first level (e.g., ninety percent) in block 410, control transfers to block 412. In block 412, the PMPC unit 201 determines whether utilization of the configurable processor resource is lower than a fourth level (i.e., lower than min?). If utilization of the configurable processor resource is not lower than the fourth level (e.g., ten percent) in block 412, control transfers to block 414. In block 414, the PMPC unit 201 determines whether utilization of the configurable processor resource is greater than a third level (i.e., higher than high?). If utilization of the configurable processor resource is not greater than the third level (e.g., seventy percent) in block 414, control transfers to block 416. In block 416, the PMPC unit 201 determines whether utilization of the configurable processor resource is lower than a second level (i.e., lower than low?). If utilization of the configurable processor resource is not lower than the second level (e.g., thirty percent) in block 416, control transfers to block 426.

If utilization of the configurable processor resource is greater than the first level in block 410, control transfers to block 418. In block 418, the PMPC unit 201 indicates that additional resources should be enabled for the configurable processor resource via a pending add power operation. Following block 418, control transfers to block 426. If utilization of the configurable processor resource is lower than the fourth level in block 412, control transfers to block 420. In block 420, the PMPC unit 201 indicates the resource should be disabled via a pending subtract power operation. Following block 420, control transfers to block 426. If utilization of the configurable processor resource is greater than the third level in block 414, control transfers to block 422. In block 422, the PMPC unit 201 indicates a pending add power operation is desirable for the resource and should be undertaken. Following block 422, control transfers to block 426. If utilization of the configurable processor resource is lower than the second level in block 416, control transfers to block 424. In block 424, the PMPC unit 201 indicates a pending subtract power operation is desirable for the resource. Following block 424, control transfers to block 426.

In block 426 (see FIG. 5), the PMPC unit 201 adds all pending add power operations and all pending subtract power operations. Next, in decision block 460, the PMPC unit 201 determines whether the total added power to the current power is less than the power level preset in block 404. If the total added power and the current power are less than the preset power level in block 460, control transfers to block 462, where the PMPC unit 201 enables all pending enable resources based on the pending add power operations as there is no need to disable any resources.

Following block 462, control transfers to block 406 for a next interval count. If the total added power and the current power are greater than or equal to the preset power level in block 460, control transfers to decision block 428. In block 428, the PMPC unit 201 determines whether a value of all of the pending subtract power operations are greater than a value of all of the pending add power operations. In response to the value of all of the pending subtract power operations being greater than the value of all of the pending add power operations (which indicates that all pending add power operations may be performed while staying within a power budget), control transfers from block 428 to block 430. In block 430, the PMPC unit 201 enables all pending enable resources based on the pending add power operations. It should be appreciated that an additional decision block (not shown) can be added to determine if the total pending subtract power is more than one-half of the power preset in block 404. In this case, one of the reconfigurable block 208A or 208B can be disabled.

Next, in block 432, the PMPC unit 201 accesses the resource list from the top down (i.e., first addresses resources that will increase performance the most by not being disabled). Then, in decision block 434, the PMPC unit 201 determines whether a pending disable resource (i.e., a resource that is to lose resources) is at a minimum unit level set by block 420 (see the min configuration column of FIG. 3). In response to the pending disable resource being at a minimum configuration in block 434, control transfers to block 436. In block 436, the PMPC unit 201 disables the resource, at which point control transfers to block 434 where a next resource that has units that are to be disabled is addressed.

In response to the pending disable resource not being at a minimum in block 434, control transfers to block 438 where the PMPC unit 201 subtracts the weighted power for the current pending disable resource from the pending subtract power and compares the result of the pending add power (i.e., the weighted power to be added for resources that are to receive additional units). Next, in decision block 440, the PMPC unit 201 determines whether the pending subtract power is greater than the pending add power for all of the resources. If the pending subtract power is greater than the pending add power in block 440 control transfers to block 434, where a next resource is selected. If the pending subtract power is not greater than the pending add power control transfers from block 440 to block 442, where the PMPC unit 201 disables all remaining resources with associated pending disable resource operations. Following block 442, control transfers to block 406 for a next interval count.

By way of further explaining blocks 430-442, assume that five pending disable resources 'A', 'B', 'C', 'D', and 'E' (i.e., resources that may have their configuration changed to reduce power consumption, albeit at lower performance) have a total pending subtract weighted power number of 100, none of the disable resources are at a minimum resource level, and are prioritized in the resource list as follows: resource 'A' has the highest priority and a subtract weighted power number of 10, resource 'B' has the next highest priority and a subtract weighted power number of 10; resource 'C' has the next highest priority and a subtract weighted power number of 20; resource 'D' has a next highest priority and a subtract weighted power number of 20; and resource 'E' has the lowest priority and a subtract weighted power number of 20. Additionally, assume that four pending enable resources 'F', 'G', 'H' and 'I' (i.e., resources that may have their configuration changed to increase performance, albeit at higher power consumption) have a total pending add weighted power number of 80 and individual add weighted power numbers of 20. In the example, above, in block 434 the resource 'A' is the first resource addressed due to the location of resource 'A' in the resource list. Since resource 'A' is not at a minimum level its weighted power (i.e., 10) is subtracted from the pending subtract weighted power number (i.e., 100) to yield a new pending subtract weighted power number of 90, which is compared to the add subtract weighted power number of 80.

As 90 is greater than 80, control transfers from block 438 to block 440 to block 434, where a next resource (i.e., resource 'B') is addressed. Since resource 'B' is not at a minimum level its weighted power (i.e., 10) is subtracted from the pending subtract weighted power number (i.e., 90) to yield a new pending subtract weighted power number of 80, which is compared to the add weighted power number of 80. As 80 is not greater than 80, control transfers from block 438 to block 440 to block 442, where all remaining pending enable resources (i.e., resource 'C', resource 'D', and resource 'E') are disabled, with the pending disable resources of resource 'A' and resource 'B' remaining enabled due to their priority location in the resource list.

Returning to the discussion of FIGS. 4 and 5, in response to the value of the pending subtract power operations being less than or equal to the value of the pending add power operations (which indicates that all pending add power operations may not be able to be performed while staying within a power budget), control transfers from block 428 to block 444. In block 444, the PMPC unit 201 disables all pending disable resources in preparation for enabling additional resources for pending enable resources. Next, in block 446, the PMPC unit 201 accesses the resource list from the bottom up (i.e., first addresses resources that will adversely affect performance the least amount). Next, in decision block 448, the PMPC unit 201 determines whether a pending enable resource (i.e., a resource that is to receive additional resources) is at a maximum set by block 418. In response to the pending enable resource being at a maximum in block 448, control transfers to block 450, where the PMPC unit 201 enables the resource and goes to a next enable resource (i.e., a resource that is to have units added) before returning control to block 448.

In response to the pending enable resource not being at a maximum in block 448, control transfers to block 452, where the PMPC unit 201 subtracts weighted power for the pending enable resource from the pending add power and compares the result of the pending add power to the pending subtract power. Next, in decision block 454, the PMPC unit 201 determines whether the pending subtract power is greater than the pending add power. If the pending subtract power is not greater than the pending add power, control transfers from block 454 to block 448 where a next pending enable resource is selected. If the pending subtract power is greater than the pending add power in block 454, control transfers to block 456, where the PMPC unit 201 enables all remaining pending enable resources. Following block 456, control transfers to block 406 for a next interval count.

By way of further explaining blocks 444-456, assume that five pending enable resources 'A', 'B', 'C', 'D', and 'E' have a total pending add weighted power number of 100, none of the enable resources are at a maximum resource level, and are prioritized in the resource list as follows: resource 'A' has the highest priority and an add weighted power number of 10, resource 'B' has the next highest priority and an add weighted power number of 10; resource 'C' has the next highest priority and an add weighted power number of 20; resource 'D' has a next highest priority and an add weighted power number of 20; and resource 'E' has the lowest priority and an add weighted power number of 20. Additionally, assume that four pending disable resources 'F', 'G', 'H' and 'I' have a total pending add weighted power number of 80 and individual add weighted power numbers of 20.

In the example above, in block 448 the resource 'E' is the first resource addressed due to the location of resource 'E' in the resource list. Since resource 'E' is not at a maximum level its weighted power number (i.e., 10) is subtracted from the pending add weighted power number (i.e., 100) to yield a new pending add weighted power number of 90, which is compared to the pending subtract weighted power number of 80. As 90 is greater than 80, control transfers from block 452 to block 454 to block 448, where a next resource (i.e., resource 'D') is addressed. Since resource 'D' is not at a maximum level its weighted power (i.e., 10) is subtracted from the pending add weighted power number (i.e., 90) to yield a new pending add weighted power number of 80, which is compared to the subtract weighted power number of 80. As 80 is not greater than 80, control transfers from block 452 to block 454 to block 456, where all remaining pending enable resources (i.e., resource 'A', resource 'B', and resource 'C') are enabled, with the pending enable resources of resource 'D' and resource 'E' remaining disabled due to their priority location in the resource list.

Accordingly, techniques have been disclosed herein that allow configurable processor resources to be periodically reconfigured to meet power requirements of a customer while maintaining relatively high performance levels.

As will be appreciated, the processes in various embodiments of the present invention may be implemented using any combination of executed software, firmware or hardware. As a preparatory step to practicing the invention in software, code (whether software or firmware) according to a preferred embodiment will typically be stored in one or more machine readable storage mediums such as semiconductor memories such as read-only memories (ROMs) such as NVMs, programmable ROMs (PROMs), etc., thereby making an article of manufacture in accordance with the invention. The article of manufacture containing the code is used by either executing the code directly from the storage device or by copying the code from the storage device into another storage device such as a random access memory (RAM), etc. An apparatus for practicing the techniques of the present disclosure could be one or more communication devices.

Although the invention is described herein with reference to specific embodiments, various modifications and changes can be made without departing from the scope of the present invention as set forth in the claims below. For example, the techniques disclosed herein are generally broadly applicable to systems that facilitate data communication. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of performing power management for configurable processor resources of a processor, comprising:
   determining whether to increase, decrease, or maintain resource units for each of the configurable processor resources based on utilization of each of the configurable processor resources; and
   substantially maintaining a total weighted power number, corresponding to a sum of weighted power numbers for the configurable processor resources, for the processor while increasing by at least a first resource unit of the resource units for each of the configurable processor resources whose utilization is above a first level and decreasing by at least a second resource unit of the resource units for each of the configurable processor resources whose utilization is below a second level, wherein, based on a prioritized resource list, the first resource unit of the resource units is prioritized higher than the second resource unit of the resource units.

2. The method of claim 1, wherein the configurable processor resources include instruction queues, decode units, issue units, and register files.

3. The method of claim 1, wherein the determining and maintaining are performed by a performance monitor and power control unit.

4. The method of claim 1, wherein the resource units correspond to a resource size or a number of resources allocated.

5. The method of claim 1, wherein the determining occurs following a predetermined number of processor cycles.

6. The method of claim 1, wherein the first and second levels are different for different ones of the configurable processor resources.

7. The method of claim 1,
   wherein the second resource unit of the resource units includes a physical register file that includes a first number of utilized entries of the physical register file; and
   wherein decreasing by the at least the second resource unit of the resource units includes decreasing the first number of utilized entries of the physical register file to a second number, less than the first number, of utilized entries of the physical register.

8. A processor system, comprising:
   a processor including configurable processor resources; and a power management and control unit coupled to the processor, wherein the power management and control unit is configured to determine whether to increase, decrease, or maintain resource units for each of the configurable processor resources based on utilization of each of the configurable processor resources, and substantially maintain a total weighted power number, corresponding to a sum of weighted power numbers for the configurable processor resources, for the processor while increasing by at least a first resource unit of the resource units for each of the configurable processor resources whose utilization is above a first level and decreasing by at least a second resource unit of the resource units for each of the configurable processor resources whose utilization is below a second level, wherein, based on a prioritized resource list, the first resource unit of the resource units is prioritized higher than the second resource unit of the resource units.

9. The processor system of claim 8, wherein the configurable processor resources include an instruction cache, a branch prediction unit, load/store queues, simple instruction queues, complex instruction queues, arithmetic logic units, and data caches.

10. The processor system of claim 8, wherein the resource units correspond to a number of set associative ways of a memory.

11. The processor system of claim 8, wherein the determination of whether to increase, decrease, or maintain resource units for each of the configurable processor resources occurs following a predetermined number of processor cycles.

12. The processor system of claim 8, wherein a performance monitor and power control unit assigns the weighted power numbers to the configurable processor resources.

13. The processor system of claim 8,
wherein the second resource unit of the resource units includes a physical register file that includes a first number of utilized entries of the physical register file; and
wherein as the power management and control unit decreases by the at least the second resource unit of the resource units the power management and the control unit decreases the first number of utilized entries of the physical register file to a second number, less than the first number, of utilized entries of the physical register.

14. A method of performing power management for configurable processor resources of a processor, comprising:
determining whether to increase, decrease, or maintain resource units for each of the configurable processor resources based on a performance monitor count for each of the configurable processor resources; and
substantially maintaining a total weighted power number, corresponding to a sum of weighted power numbers for the configurable processor resources, for the processor while increasing by at least a first resource unit of the resource units for each of the configurable processor resources whose performance monitor count is above a first level and decreasing by at least a second resource unit of the resource units for each of the configurable processor resources whose performance monitor count is below a second level, wherein, based on a prioritized resource list, the first resource unit of the resource units is prioritized higher than the second resource unit of the resource units.

15. The method of claim 14, wherein the configurable processor resources include an instruction cache, a branch prediction unit, instruction queues, decode units, issue units, load/store queues, simple instruction queues, complex instruction queues, register files, arithmetic logic units, and data caches.

16. The method of claim 14, wherein the determining and maintaining are performed by a performance monitor and power control unit.

17. The method of claim 14, wherein the resource units correspond to a number of resources allocated.

18. The method of claim 14, wherein the determining occurs following a predetermined number of processor cycles.

19. The method of claim 14, wherein the first and second levels are different for different ones of the configurable processor resources.

20. The method of claim 14,
wherein the second resource unit of the resource units includes a physical register file that includes a first number of utilized entries of the physical register file; and
wherein decreasing by the at least the second resource unit of the resource units includes decreasing the first number of utilized entries of the physical register file to a second number, less than the first number, of utilized entries of the physical register.

* * * * *